United States Patent [19]

Sato et al.

[11] Patent Number: 4,579,466

[45] Date of Patent: Apr. 1, 1986

[54] LABEL PRINTER

[75] Inventors: Yo Sato, Tokyo; Tadao Kashiwaba; Yasuhiko Matsuda, both of Iwate, all of Japan

[73] Assignee: Kabushiki Kaisha Sato, Japan

[21] Appl. No.: 587,283

[22] Filed: Mar. 7, 1984

Related U.S. Application Data

[62] Division of Ser. No. 354,060, Mar. 2, 1982, Pat. No. 4,439,257.

[30] Foreign Application Priority Data

Mar. 5, 1981 [JP] Japan ................................. 56-30525

[51] Int. Cl.[4] ........................ B41J 11/26; B32B 31/00; B44C 7/00; B41F 1/08

[52] U.S. Cl. .................................... 400/120; 400/613; 101/288; 156/384; 156/510; 156/579; 156/577

[58] Field of Search ............... 156/277, 384, DIG. 33, 156/541, 540, 542, 577, 510, 579, 539, 353; 101/288; 400/613, 615.2, 134.5, 120; 221/25; 242/55, 53

[56] References Cited

U.S. PATENT DOCUMENTS

| | | | |
|---|---|---|---|
| 2,518,011 | 8/1950 | Hoppe | 156/DIG. 33 |
| 2,933,216 | 4/1960 | Cole | 156/DIG. 33 |
| 3,814,651 | 6/1974 | Wada | 156/DIG. 33 |
| 4,073,234 | 2/1978 | Sato | 156/384 |
| 4,176,603 | 12/1979 | Sato | 400/134.5 |
| 4,191,608 | 3/1980 | Bussard et al. | 156/DIG. 33 |
| 4,233,900 | 11/1980 | Sato | 156/384 |

*Primary Examiner*—Edward Kimlin
*Assistant Examiner*—L. Falasco
*Attorney, Agent, or Firm*—Ostrolenk, Faber, Gerb & Soffen

[57] ABSTRACT

The invention concerns a label printing and applying apparatus. The printing apparatus includes a mount for detachably mounting a label holder to the printer. After being printed a web of labels is wound onto a roll in the holder while the label holder is attached to the printer. The label holder may then be separated from the printer and is attached to an applier at which time the holder may deliver labels to the applier for being applied. When a roll of labels has been wound upon the label holder, a cutting knife on the printing apparatus cuts the label web, thereafter permitting separation of the label holder from the label printer. Printing of the labels is done in a rotary platen on the label printer. A drive transmission connects the rotary platen with the label winding roll for rotating the roll when the label holder is on the label printer. Instructions to the printer for printing particular indicia are inputted. A memory circuit on the label holder may then store the inputted instructions for each label.

4 Claims, 15 Drawing Figures

LABEL PRINTER

RELATED APPLICATIONS

This is a division of U.S. patent application Ser. No. 354,060, filed Mar. 2, 1982 now U.S. Pat. No. 4,439,257.

BACKGROUND OF THE INVENTION

1. Field of the Invention

The present invention relates to a label printing apparatus for printing labels, which are temporarily adhered in series to a web of backing paper, and for then winding the labels onto a label holder detachably mounted on the printing apparatus.

2. Description of the Prior Art

Label printing and applying apparatus are used in supermarkets, shops or the like. They are either nonportable, e.g. desk or table type, or they are portable types, as their intended uses dictate.

Generally, all the desk type apparatus are electrically powered, and they are roughly classified into two kinds. In one kind, a number of labels are arranged in series on their backing paper web, are continuously printed and are fed out in series to the exit from the apparatus, while still temporarily adhered to their backing paper web.

In the other kind of desk type apparatus, an electronic type, weighing, human readable character printer for weighing meat, fish, vegetables, or the like, and for printing and delaminating labels, is combined with an electronic bar code (for POS) printer for printing and delaminating labels. When an article is placed on a weighing pan, the two printers, i.e., the weighing, human readable character printer and the electronic bar code printer, print the two respective labels on the respective backing paper webs, separately printing human readable characters and bar codes in response to the electric signals coming from the weighing balance. The respective backing paper webs corresponding to the printed labels are turned at acute angles so that the printed labels are delaminated from the respective backing paper webs and the labels and the backing paper exit separately at two exits. The one label then at the exit from the human readable character printer is manually pinched and applied to the surface of an article, whereas the bar code label arranged at the exit of the bar code printer has its adhesive side applied and adhered to the back of the aforementioned article.

However, it is remarkably inefficient to manually bring the articles individually in the aforementioned manner to the bar code labels, and it is difficult to apply these bar code labels at desired positions. As a result, the desk type apparatus, which is combined with that weighing balance, is not used near the display shelves in shops, such as the supermarkets, because it is not suitable for such use.

In order to display commodities bearing printed labels on the display shelves of shops, therefore, currently only the other kind of apparatus is used, i.e., the desk type apparatus from which a number of labels printed in series are fed, while they are temporarily adhered to the backing paper web. Moreover, in applying the labels, which are printed by such apparatus, to commodities, a number of employees in the rear area of the shop peel the individual labels with their fingers, for a long time before the commodities are displayed at a counter, i.e., either before the shop is opened or after the shop is closed. Since the labels are applied manually by the workers, the speed of applying the labels to the commodities is usually as low as about 10 to 20 sheets per minute, producing poor working efficiency. In contrast, the label applying speed is about 100 sheets per minute for a hand labeler, which is capable of continuously applying the labels. At the same time, since the imprints on the labels are rubbed by the workers' fingers during label applying, the printed surfaces are often blotted and become hard to read.

The manual and portable type label printing and applying apparatus (called a "hand labeler") for printing and applying labels to articles is widely used mainly at the shop counter for label printing and applying purposes. Since this hand labeler is constructed so that the label printing and feeding operations are performed by repeated squeezing and releasing of the hand lever, the workers become tired. Moreover, since loud sounds are generated from the type surfaces of the printing head and from the platen which receives the types, the noises may raise a problem for some shops. Especially in a printing head for printing POS bar codes, strict accuracy is required for the width and spacing of the bar codes because these bar codes have to be read out by means of an optical reader. Nevertheless, due to a constructional error in the printing head and due to an excess or a shortage of the ink applied to the type surfaces, the bar codes are often neither accurately printed nor correctly read out. Furthermore, the bar code printing head necessarily is larger than the usual letter printing head because of the standardized size of the bar codes. As a result, the size and weight of the hand labeler are increased which fatigues the workers. At the same time, since bar code prints are difficult to understand by general workers, in contrast with numerals or letters, the bar code labels printed for one commodity are often erroneously applied to others. Although the bar codes require check digits, furthermore, the hand labeler is usually not able to be furnished with a function to automatically calculate the check digits, due to the limits in its size and construction. Therefore, the check digits have to be disadvantageously calculated in a separate manner and to be set in the printing head.

Therefore, label printing and applying apparatus according to the prior art, both desk or portable type, present a variety of problems, which should be solved, especially as the POS system comes into general use.

SUMMARY OF THE INVENTION

It is, therefore, an object of the present invention to provide a label printing apparatus which is free from all of the problems thus far described.

Another object of the present invention is to provide a label printing apparatus which prints labels well, and which is enabled to remarkably improve the efficiency of label applying.

The present invention provides a label printing apparatus. The apparatus comprises a printer for printing labels of a composite label web, in which the labels are temporarily adhered in series to a web of backing paper. The printer has a mount for removably attaching a label holder to the printer for receiving and rolling up the printed composite label web. The label holder may then be removably attached to a separate label applier for unrolling the composite label web from the label holder to delaminate the labels from the backing paper web, and for applying the delaminated labels to articles.

BRIEF DESCRIPTION OF THE DRAWINGS

Other objects and features of the present invention will become apparent from the following description taken in conjunction with the accompanying drawings, in which:

FIGS. 1 to 4 show an embodiment of the present invention wherein:

FIG. 1 is a sectional view showing the printer of the invention and a label holder for use with the invention with the label holder shown attached to and detached from the printer;

FIG. 2 is a sectional view showing the printer and the label holder, taken at a right angle with respect to FIG. 1;

FIG. 3 is a top plan view showing the printer;

FIG. 4 is also a top plan view, showing a label cutting mechanism;

DESCRIPTION OF THE PREFERRED EMBODIMENTS

Figure 1:
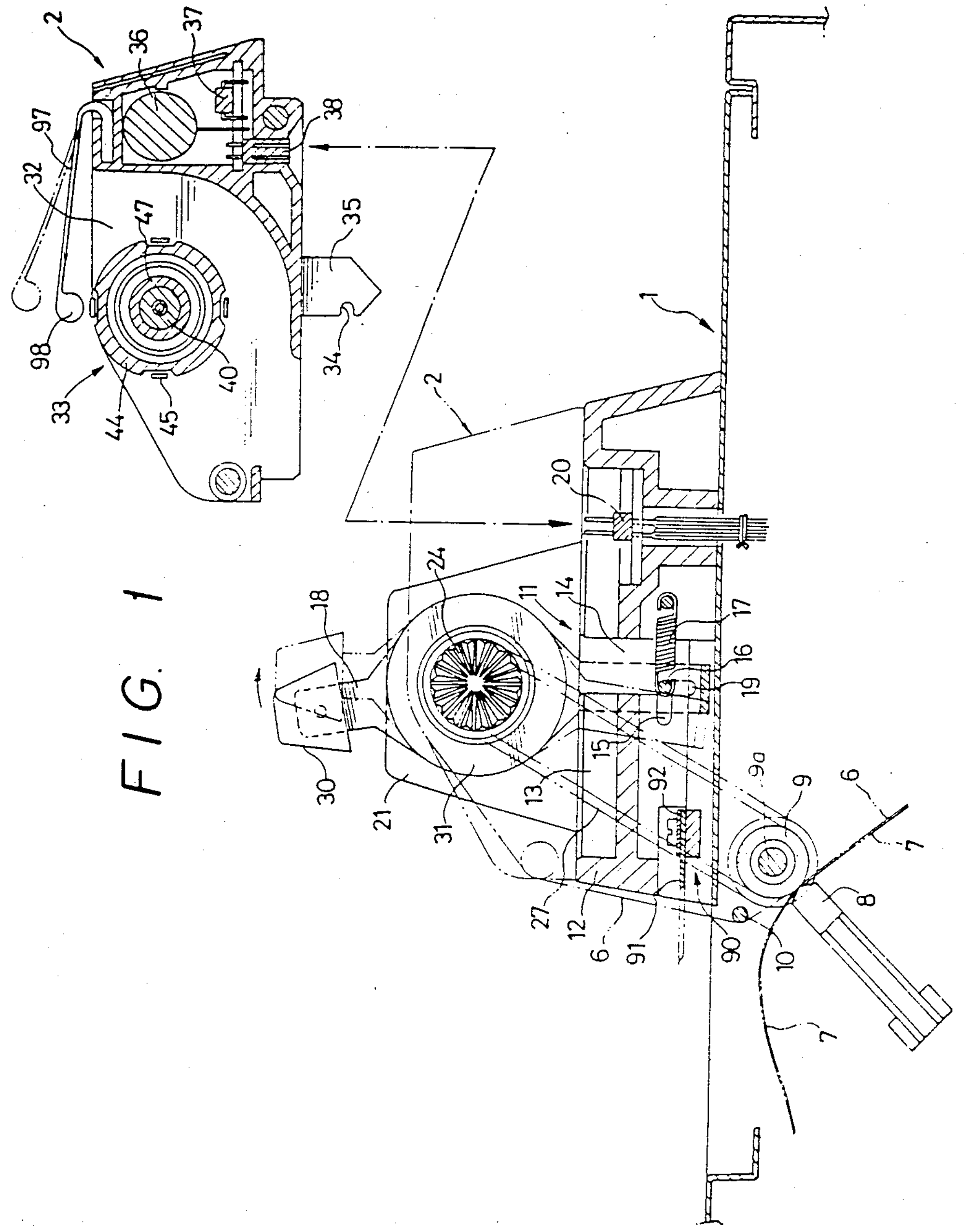

The present invention will now be described in detail with reference to the accompanying drawings.

FIGS. 1 to 4 show an embodiment of the label printing apparatus according to the present invention, which comprises a printer 1 on which is mounted a label holder 2. The label holder 2 is removably mounted selectively in either of the printer 1 and a label applier 3 shown in FIGS. 5–7.

The printer 1 prints labels with predetermined indicia and feeds the printed labels along a feed path to the outside of the label printing apparatus. The printing mechanism and the feed mechanism are means which are well known in the prior art. The embodiment described adopts a heat-sensitive printing mechanism of the thermal transfer type (which is called a "thermal printer"). A composite label web 6, shown in FIG. 8, had been prepared by temporarily adhering a series of labels 4 to one side of a web of backing paper 5. The labels are laminated on a thermal transfer ribbon 7 (e.g., a carbon ribbon), so that as the web is fed, its labels 4 are printed between a thermal head 8 and a platen roller 9. Conventional drive means 9*a* drive the roller 9 to rotate, and this operates the printer 1 and the label holder 2, as described below. After that, the thermal transfer ribbon 7 is delaminated from the composite label web 6 and is separately rolled up, whereas the composite label web 6 is turned around a turning pin 10 until it is rolled up by the label holder 2 which is set in the upper portion of the printer 1.

The thermal printer reduces the generation of noises resulting from the stamping sounds during the printing operation, while providing excellent printing performance. This permits suitable application of the printer to bar code printing.

A mount 11 for a printer 1, in which the label holder 2 is to be removably set, is now described with reference to FIGS. 1 to 4. A mounting bed 12 is formed on the upper surface of the printer 1. It has a mounting recess 13 at its upper portion. The center of the recess 13 is formed with a deeper retaining recess 14. At both sides of the mounting bed 12, the apparatus frame includes slots 15, into which a retaining pin 16 is inserted to extend. The retaining pin 16 is biased by a pair of coil springs 17 to always protrude into the retaining recess 14. The retaining pin 16 also has both of its ends loosely fitted in the vertical slots 19 in the lower portion of a demounting lever 18, described below. At the rear end (to the right in FIG. 1) of the mounting recess 13, there is a connector 20 which is connected with a control unit (not shown) disposed inside of the printer 1.

Figure 2:
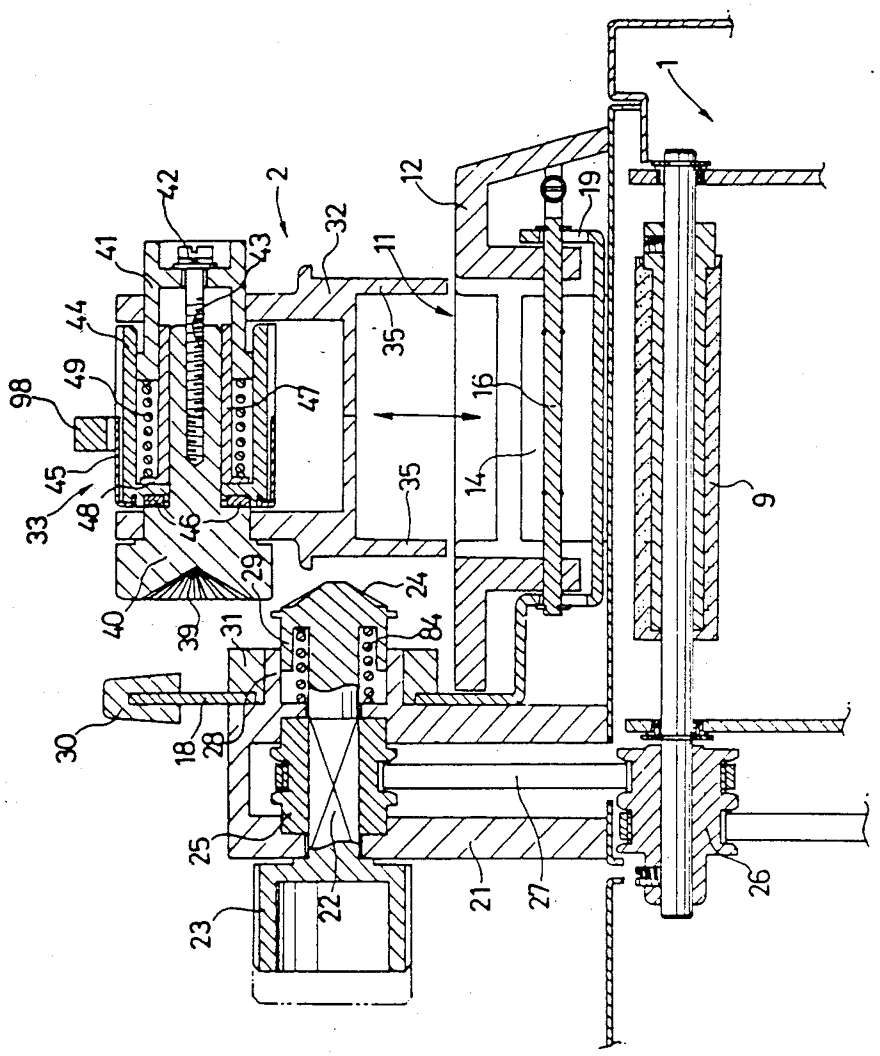

At one side of the mounting bed 12, there is raised upright a supporting bed 21 having an upper portion, through which a transmission shaft 22 extends (as shown in FIG. 2). One end of the transmission shaft 22 is formed with a knob 23. Its other end face is convex and generally conical and is formed with radially extending engaging teeth 24. The center portion of the shaft 22 inside of the supporting bed 21 is equipped with a pulley 25. A belt 27 runs under tension upon both the pulley 25 and a pulley 26 which is mounted on the shaft of the platen roller 9.

One side of the supporting bed 21 has an annular protrusion 28, in which is fitted an annular protrusion 29 extending from the outer circumference of one end of the transmission shaft 22 toward the other end of that shaft. Inside the space which is defined by those two annular protrusions 28 and 29, a compression coil spring 84 is confined. It urges the transmission shaft 22 to the right, as viewed in FIG. 2 for engaging the rotating shaft 40, as described below. On the outer circumference of the annular protrusion 28, an annular member 31 is fitted. It is fixed to the demounting lever 18. The upper end of the lever is formed with a knob 30. Moving demounting lever 18, as shown in FIG. 1, detaches label holder 2 by moving retaining pins 16 from retainer notches 34 discussed below.

Figure 4:
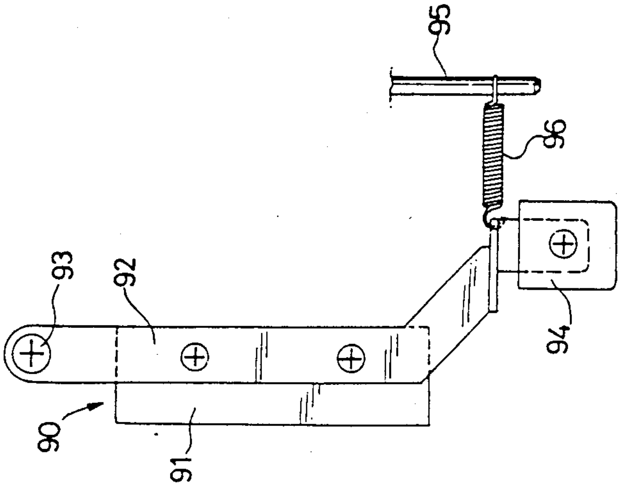
Figure 3:
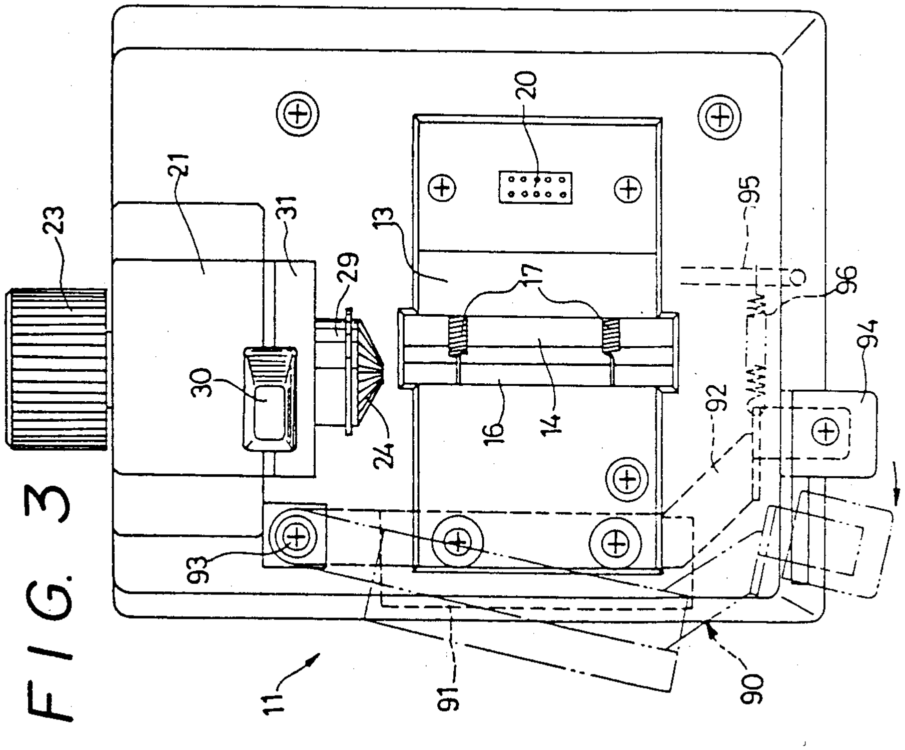

A label cutting mechanism 90 is disposed above the platen roller 9. As shown in FIG. 4, it comprises a cutting lever 92 equipped with a cutting blade 91. One end of the lever 92 is hinged to the mounting bed 12 by a pivot 93, and the other end of that lever is equipped with a knob 94. A return coil spring 96 is mounted between that other knob bearing end of the lever 92 and a spring retaining rod 95, thereby to urge the cutting lever 92 counter-clockwise in FIG. 3 at all times. At the end of the printing operation, the cutting lever 92 is rotated clockwise by means of the knob 94 so that the composite label web 9 is cut by the cutting blade 91.

The label holder 2 is a cassette type so that it can be removably mounted in the printer 1 and in the label applier 3, respectively. A label rolling mechanism 33 is rotatably disposed at the center portion of the frame 32 of the label holder 2. A pair of retainer members 35, each formed with retainer notches 34, protrude from the lower center portion of the frame 32. Inside of the rear end (to the right) of the frame 32, there are disposed a rechargeable battery 36, a memory circuit 37 for storing the content and label number to be printed by the printer 1, and a connector 38 for the input/output of such information to the memory circuit.

The label rolling mechanism 33 is now described in more detail. In one side of the frame 32, there is rotatably fitted a rotating shaft 40 which at one end has a conical depression that is formed with radially extending engaging teeth 39 for engaging with the engaging teeth 24 of the transmission shaft 22. An adjusting sleeve 41 is rotatably fitted in the other side of the frame 32. Through the center of that adjusting sleeve 41, an adjusting screw 42 is screwed, which has its leading end portion screwed into a screw thread 43 formed in the center of the rotating shaft 40. A hollow, cylindrical label strip rolling core 44 is mounted with its inner circumference supported by the rotating shaft 40 and the adjusting sleeve 41. The inward (left in FIG. 2) end of the core 44 defines an annular flange for being engaged by a rubber member 46, described below. The core 44 has its outer circumference equipped at four equally spaced locations with clamping springs 45 for clamping the leading end of the composite label web 6.

An annular rubber member 46 is fitted on the end face of the core 44 that abuts against the rotating shaft 40. A sleeve 47 is fitted on the outer circumference of the reduced leading end of the rotating shaft 40. A pressure-adjusting coil spring 49 is interposed between the leading end face of the adjusting sleeve 41 and a flange 48, which is formed at one end of the sleeve 47, thereby to force the annular rubber member 46 of the label rolling core 44 into abutting contact with the rotating shaft 40 at all times. A slip mechanism is defined, which includes the rubber member 46 interposed between the rotating shaft 40 and the core 44. The pressure between the shaft 40 and the core 44 can be adjusted by the adjusting screw 42. As a result, the label rolling core 44, which rotates in synchronism with the platen roller 9 during the label rolling, slips relative to the rotating shaft, as the external diameter of the composite label web 6 to be rolled on the core 44 is enlarged, thereby to adjust its rotations.

An elastic member 97 is attached to the upper end of the label holder 2. The member 97 is formed at its free leading end with a label holding portion 98 by which the outer circumference of the roll of the composite label web 6 is lightly held so that the web may not be loosened, while the member 97, 98 will not obstruct the feed of the composite label web 6.

Figure 6:
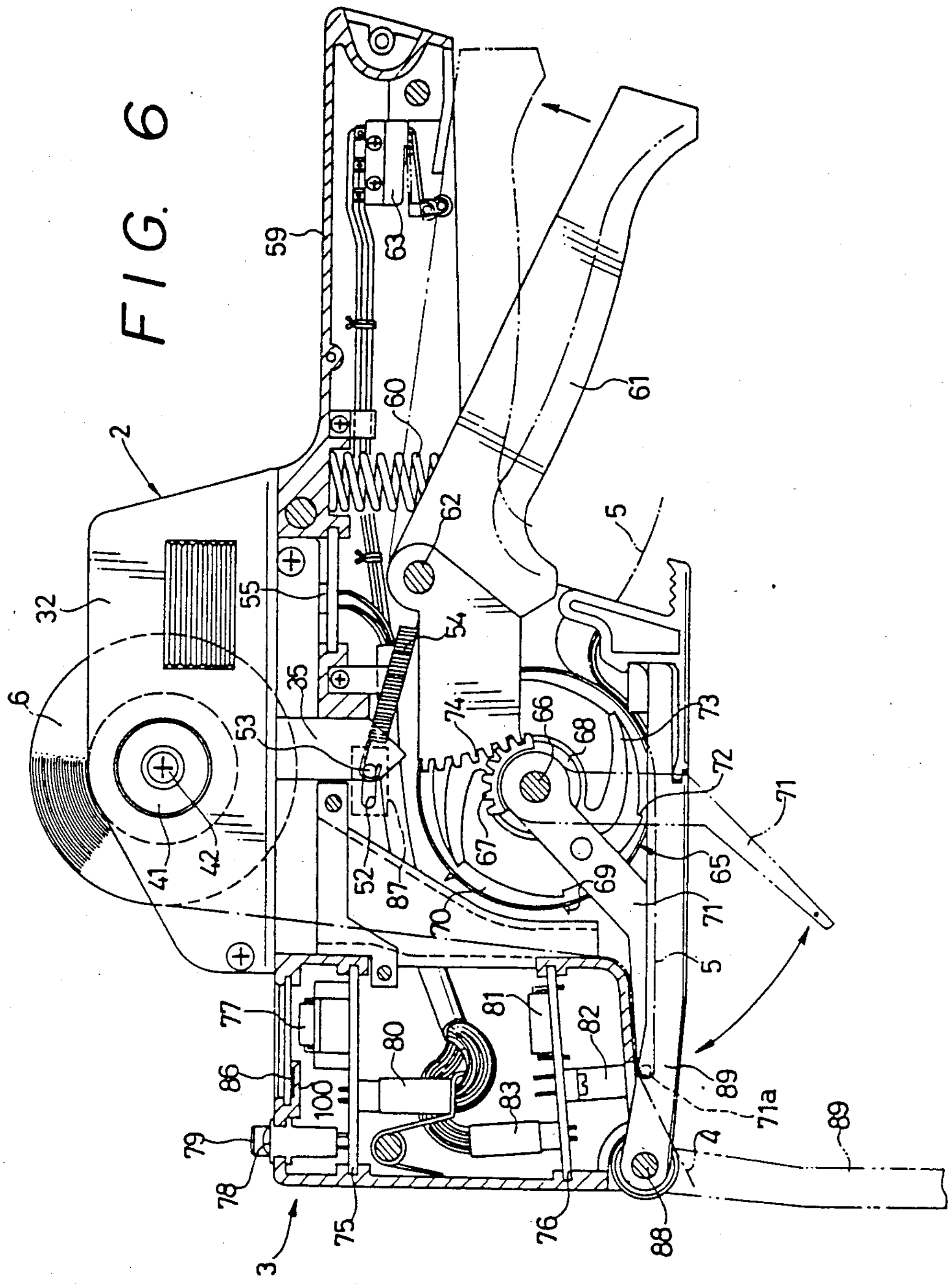
FIG. 6 is a side elevation showing the label applier, to which the label holder is attached, with the frame removed.
Figure 7:
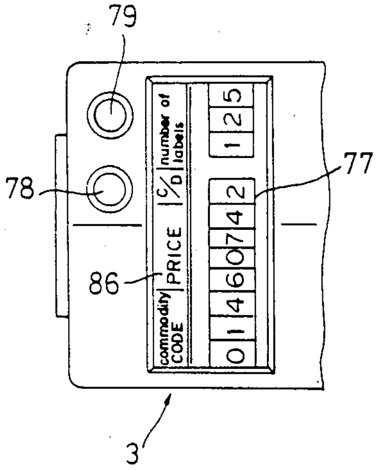
FIG. 7 is a top plan view showing the front end portion of the label applier.

The separate label applier 3 is now described with reference to FIGS. 5 to 7. The label applier is a device for unrolling the composite label web 6 from the core 44, for delaminating the labels 4 from their backing paper web 5 and for applying the delaminated labels 4 to articles. The label applier 3 is designed to permit the label holder 2 to be removably mounted therein. The label applier 3 has its upper surface formed at its center with a mounting recess 50 in which the label holder 2 is to be set. The center portion of the mounting recess 50 has a retaining recess 51 which is deep enough that the retainer members 35 of the label holder 2 may be fitted therein. At the front end of the retaining recess 51, there is a retaining pin 53 which is inserted through a pair of slots 52 formed in both sides of the frame of the applier. The pin 53 is urged to shift rearward (to the right in FIG. 5) at all times by the tensioned coil spring 54 that is secured on the pivot pin 62. Demounting knobs 87 are attached to the outsides of both sides of the pin 53. At the rear of the mounting recess 50, there is a connector 55 which is to be connected with the connector 38 of the label holder 2. At the front bottom portion of the mounting recess 50, there is a label passage 58 which is defined by a pair of guides 56 and 57 to extend downward.

The rear portion of the label applier 3 extends to form a grip 59. Below the grip, a hand lever 61 is hinged to the applier frame by a main pivot pin 62. The lever is biased clockwise by a return coil spring 60. The microswitch 63 for label issuing purposes is disposed inside of the grip 59, and a switch operating protrusion 64 for operating the microswitch is formed on the hand lever 61 at a position to oppose the switch 63 for closing the microswitch contacts.

A label feed mechanism 65 is disposed at the center portion of the label applier 3. It includes a shaft 66 on which are rotatably mounted both a pawl member 68, which is made integral with a pinion 67, and a feed roller 70, which has its outer circumference formed at predetermined intervals with label strip feed teeth 69. A plate 71 is hinged to the shaft 66.

The feed roller 70 has a circumferential rim which at one lateral side is formed on its inner circumference with retaining steps 72 which are spaced at predetermined intervals. The pawl member 68 is formed with a pair of pawls 73 made of an elastic material. When the hand lever 61 is squeezed, it brings a rack 74, which is formed at the leading end of the hand lever, into meshing engagement with the pinion 67 of the pawl member 68, thereby to rotate the pawl member 68 in the idle clockwise direction. The pawls 73 are slid on the inner circumferences of the rim of the feed roller 70 until the pawls are retained by the retaining steps 72. When the hand lever 61 is released, the pawl member 68 is rotated counterclockwise by the meshing engagement between the pinion 67 and rack 74, and the pawls 73 engaging the steps 72 rotate the feed roller 70 by a predetermined angle in the counterclockwise drive direction. In FIG. 5, a stopper 99 is shown, which is made of an elastic material and which is made engageable with other recesses (not shown) formed in the inner circumferences of the rim of the feed roller 70, for preventing the roller 70 from return rotating in the clockwise direction.

Upper and lower base plates 75 and 76 are mounted in the front portion of the label applier 3. A display unit 77, an issue lamp 78, a push button 79 and a connector 80 are connected with the upper base plate 75. A control device 81, a sensor 82 and a connector 83 are connected with the lower base plate 76. Also, the connectors 80 and 83, the connector 55 of the mounting recess 50, and the label issuing microswitch 63 are all connected with one another through lead wires. A panel holder 100 for holding a display panel 86 is formed in front of the display unit 77.

The display unit 77 is a light emitting diode display unit, for example, which displays the printed content, the number, and so on, of the labels. This information is stored in the memory circuit 37 of the label holder 2. The unit 77 displays information in response to the detection by the sensor 82 or the call from the push button 79. The issue lamp 78 is lit only when the printed information of the label being issued is displayed in the display unit 77. The lamp 78 is out in the remaining cases. The push button 79 is used to confirm the printed information, which is stored in the memory circuit, so that all of the printed information is consecutively displayed in the display unit 77 by repeatedly pushing the push button 79. The sensor 82 detects the marks 85 printed on the labels 4, as described hereinafter, thereby to effect the display of the printed information from the labels 4 in the display unit 77 and the count of the labels 4 for each issue.

Figure 9A:
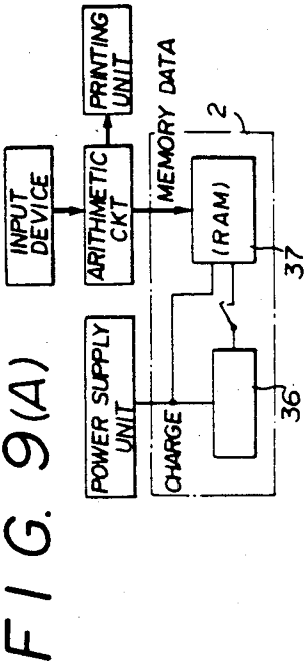
FIG. 9(A) is a block diagram showing the electric circuit for controlling the printer of the invention and the label holder.
Figure 9B:
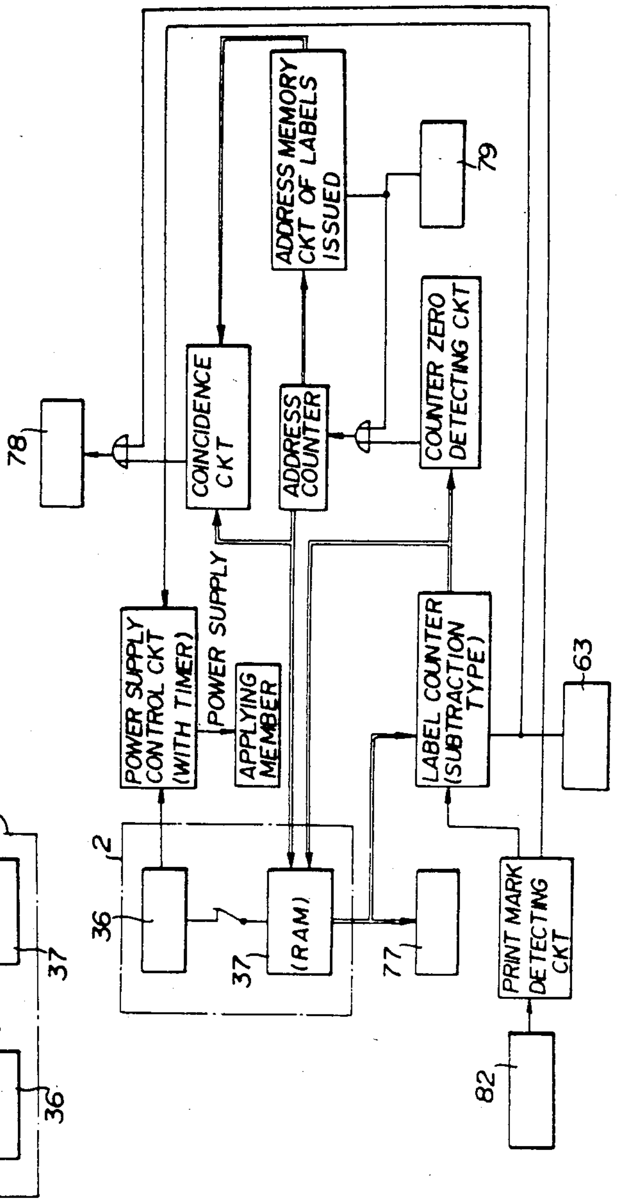
FIG. 9(B) is a view similar to FIG. 9(A), but showing the circuit construction relating to the controls of the label holder and the label applier.

The control device 81 controls the operational relationships among the memory circuit 37, microswitch 63, sensor 82, display unit 77, issue lamp 78 and push button 79, and this circuit construction is shown in FIG. 9(B). FIG. 9(A) is a block diagram showing the circuit construction of the control relationship between the printer 1 and the label holder 2.

Figure 10A:
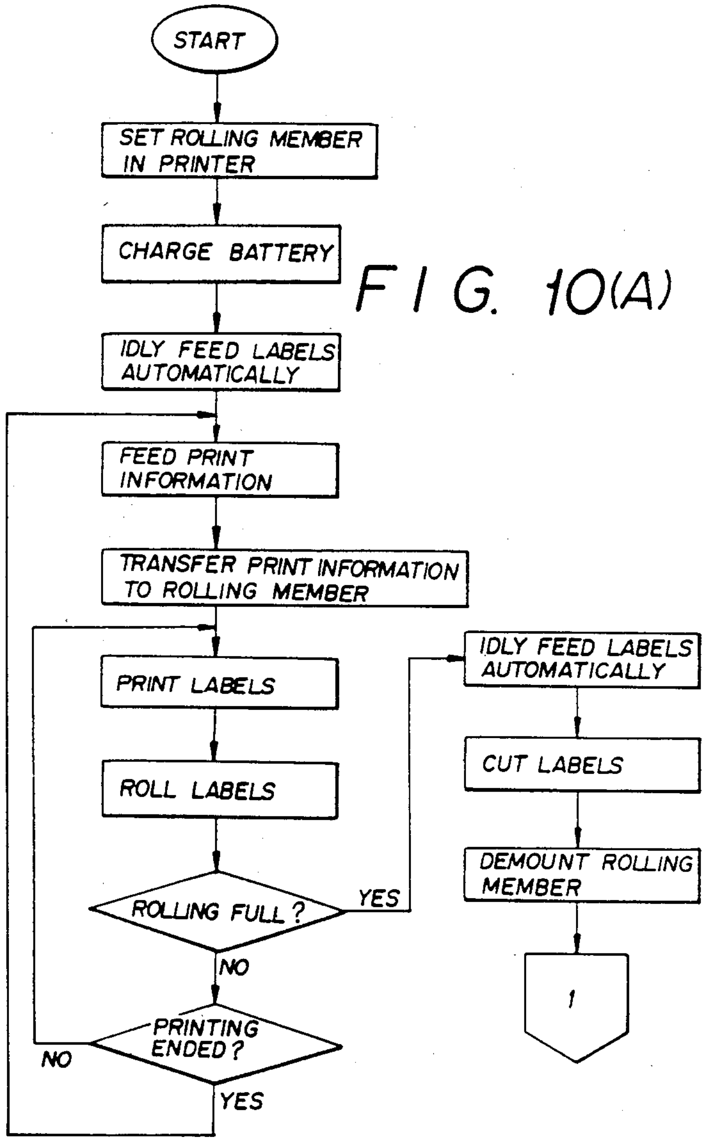
FIGS. 10(A) and 10(B) are flow charts showing the operations of the printer according to the present invention and of the label applier.
Figure 10B:
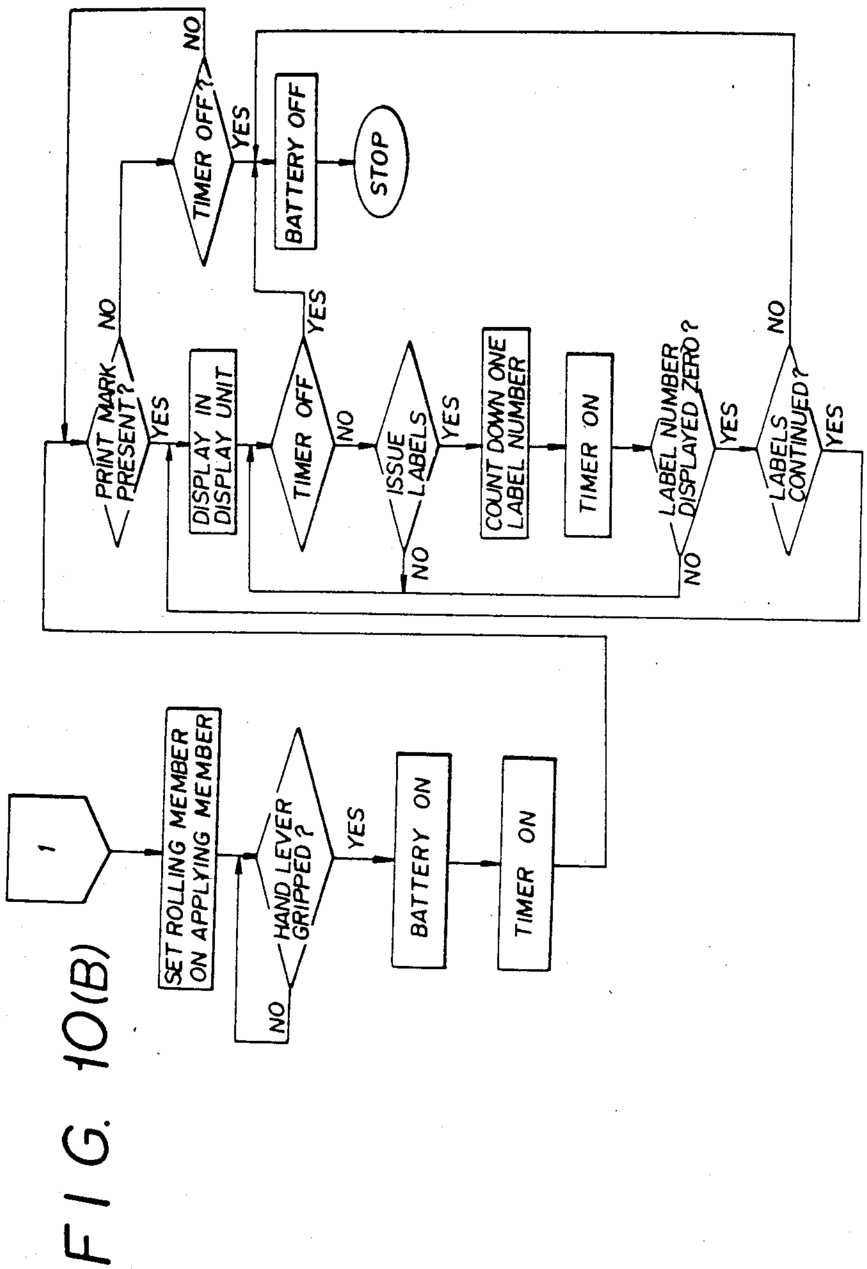
Figure 11:
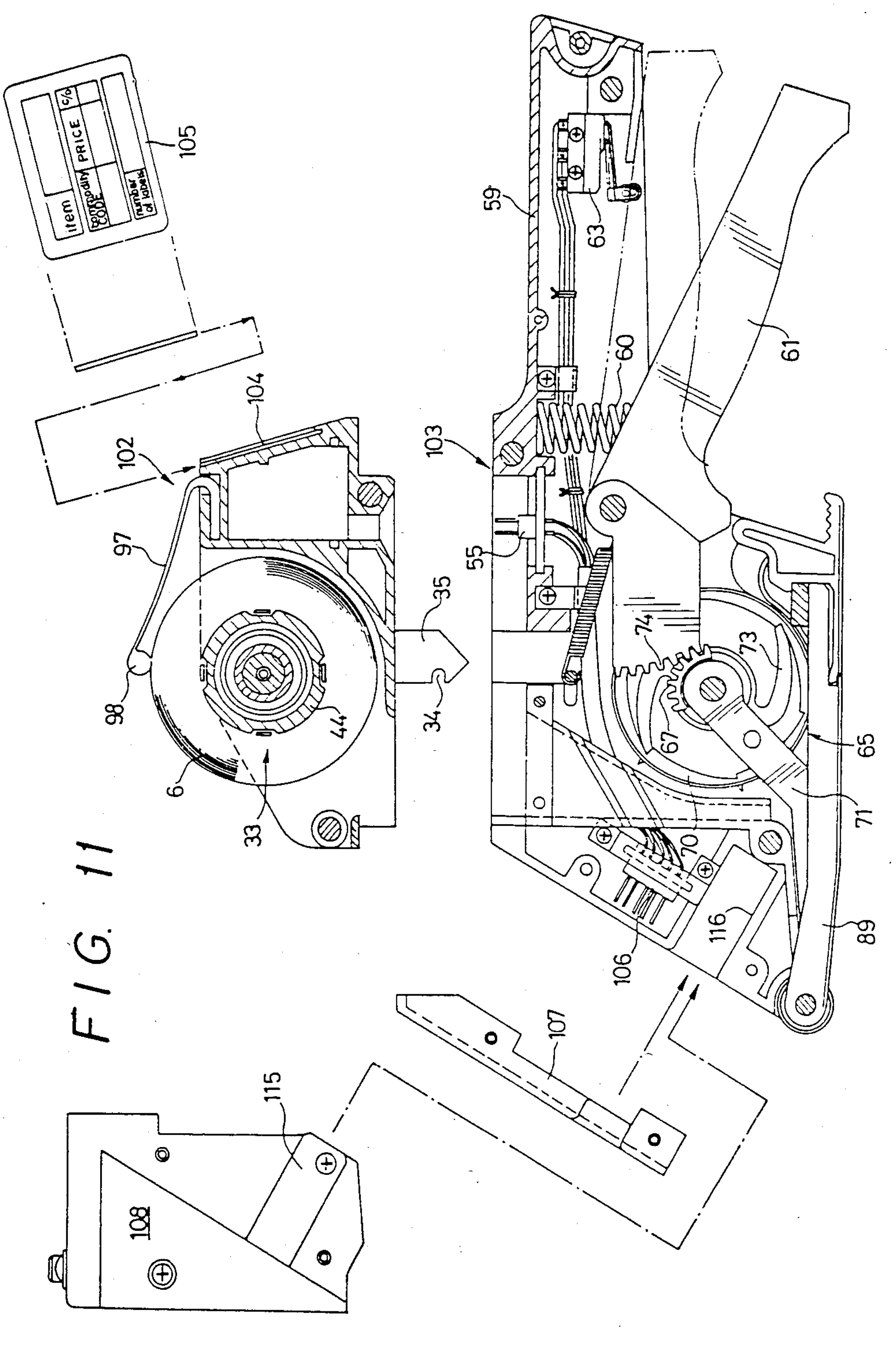
Figure 12:
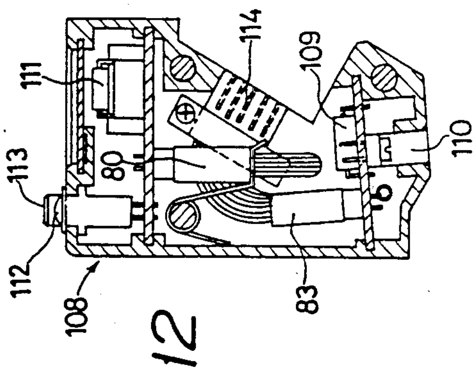
Figure 13:
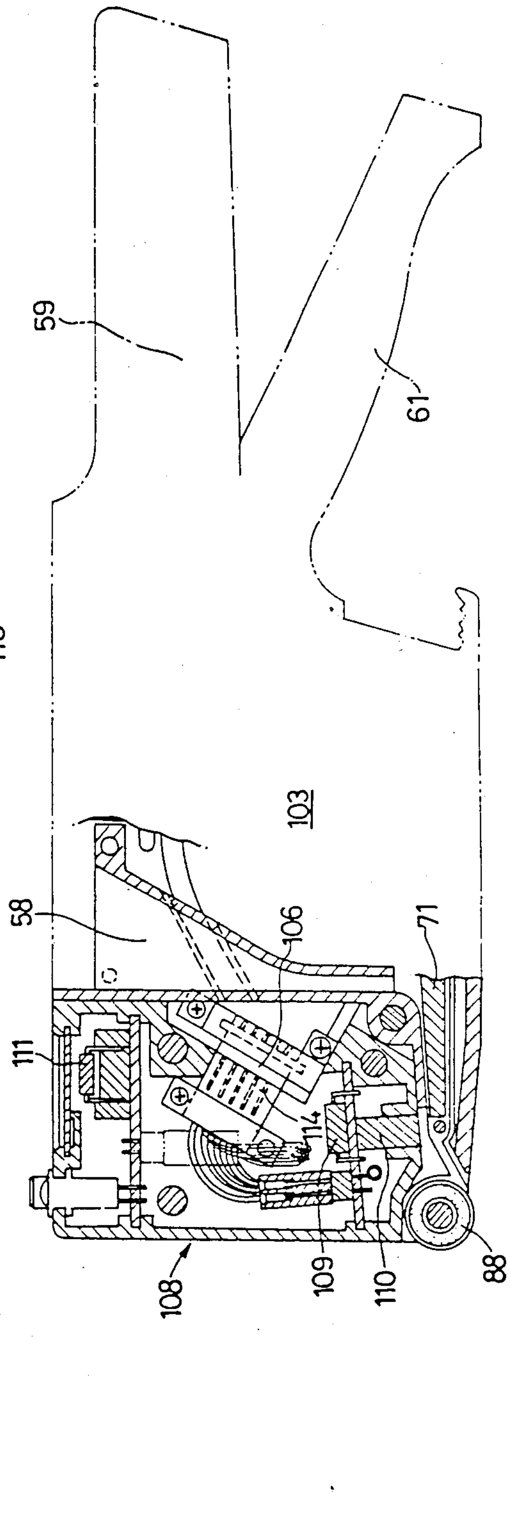

The operation of the apparatus described above is explained in connection with bar code printing operations, with reference to FIGS. 9 and 10. First, the label holder 2 is set in the mounting bed 12 of the printer 1. The retainer members 35 of the label holder 2 are inserted into the retaining recess 14 of the mounting bed 12 until the retaining pin 16 is retained by the retainer notches 34. At the same time, the connectors 20 and 38 become connected. By this setting operation, the charge of the battery 36 is started, and the engaging teeth of the transmission shaft 22 and the engaging teeth 39 of the rotating shaft 40 move into engagement.

Next, the composite label web 6 is idly fed (from a source not shown) past the printing means 8, 9 until the leading end portion of the composite label web 6 thus fed is clamped by one of the clamping springs 45 of the label rolling core 44. Then a first piece of printed information A, i.e., the printed content (e.g., a commodity code, a price or check digits) and the printed number, is fed by input means such as key operation or a floppy disc to the thermal head 8. That input information A is simultaneously transferred to and stored in the memory circuit 37 of the label holder 2.

When the printing operation is then started, the composite label web 6 is fed (upwardly in FIG. 1), and a predetermined number of its labels 4 are printed with bar codes by the action of the thermal head 8 and by the rotation of the platen roller 9 by drive means 9*a*. The rotation of the platen roller 9 is transmitted through the pulley 26, the belt 27 and the pulley 25 to the transmission shaft 22. The rotating shaft 40 is synchronously rotated by the engagement between the engaging teeth 24 and 39 so that the label strip receiving, rolling core 44, which is forced through the rubber member 46 into contact with the rotating shaft 40, is rotated at the same speed to roll up the composite label web 6 onto the core 44.

Figure 8:
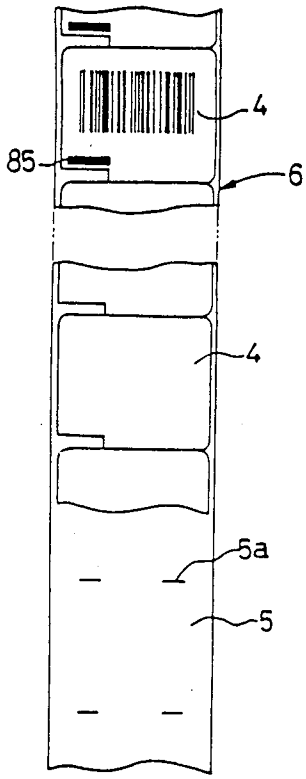
FIG. 8 is a top plan view showing a composite label web before and after the printing operation.

After the printing of the information A has ended, subsequent printed information B is fed to effect the printing and rolling operations. Likewise, all the predetermined printing operations are performed in the order of pieces of printed information C, D, - - -, and H. Moreover, all those pieces of printed information A, B, C, - - -, H are stored in the aforementioned memory circuit 37. In the printing operations thus far described, the marks 85 are printed (as shown in FIG. 8), in addition to the predetermined bar codes, at predetermined positions, e.g., at each end portion of each label 4.

During the rolling operation, as the core 44 has its rolling diameter enlarged with more of the label strip, the core is permitted to slip, by the slip mechanism 44, 46, 40, thereby to ensure the rolling operation without any difficulty.

When all of the printing operations are ended or when the rolled quantity of labels at the label holder 2 reaches a predetermined limit, the printing operation is interrupted, by the idle feed of the composite label web 6 automatically continues. When the idle feed of a predetermined number of labels is completed, the knob 94 of the label cutting mechanism 90 is shifted to the left in FIG. 3, so that the composite label web 6 is cut by the cutting blade 91. Next, the label holder 2 is demounted from the printer 1 by turning the knob 30 of the demounting lever 18 clockwise, as viewed in FIG. 1, thereby to disengage the retaining pin 16 from the retained notches 34 of the label holder 2. Then the label holder 2 is lifted out.

Figure 5:
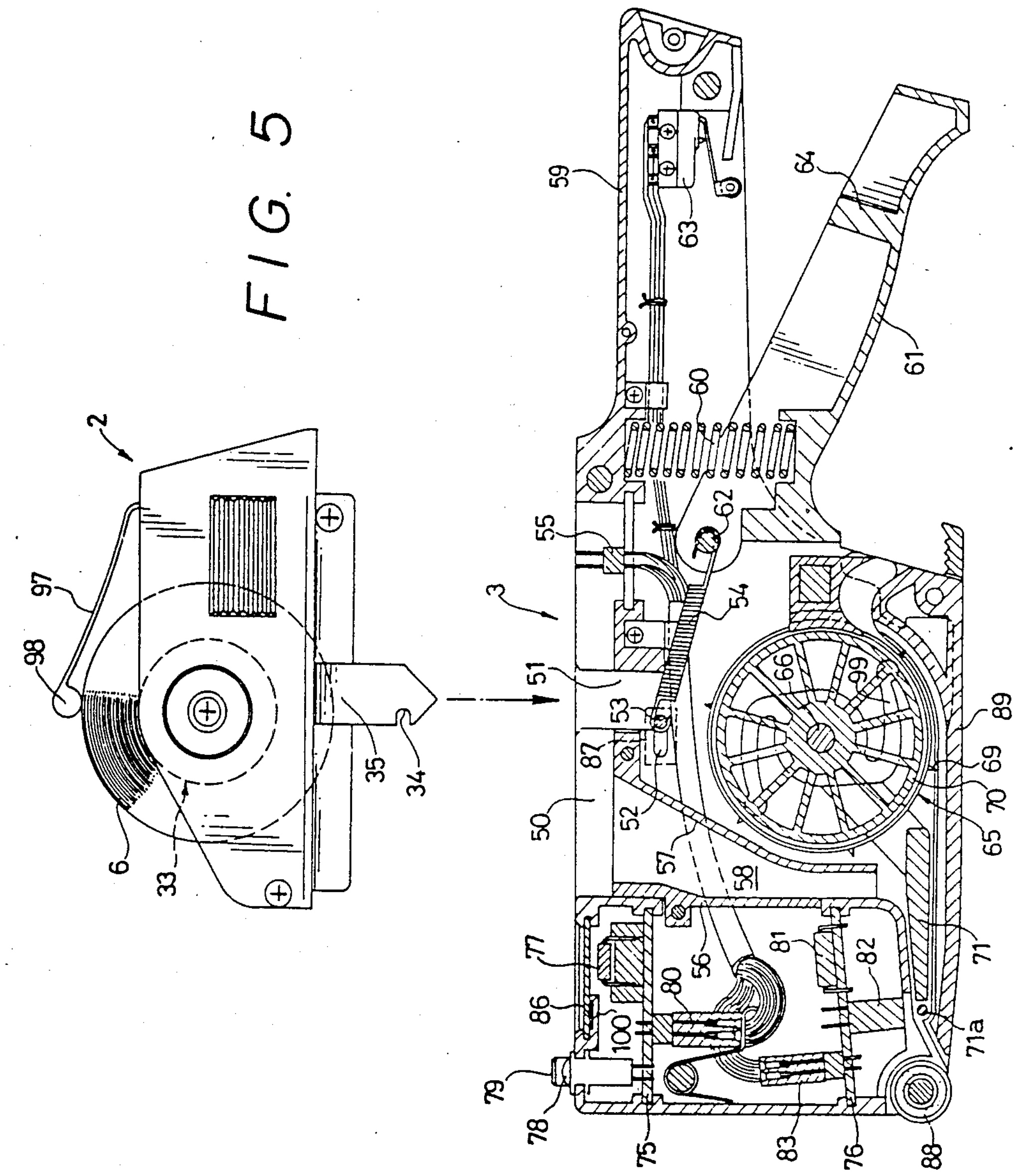
FIG. 5 shows the label holder in a side elevation and a label applier for use with the label holder in section, wherein the label holder is detached from the label applier.

Next, the loaded label holder 2 is set in the mounting recess 50 of the label applier 3, which is shown in FIG. 5. The retainer members 35 are inserted into the retaining recess 51 until the retainer notches 34 are retained on the retaining pin 53. The connectors 38 and 55 are also connected. Then the tail end portion of the printed composite label web 6 is extracted from the label holder 2 and is inserted into and through the label passage 58. The bottom cover 89 of the label applier 3 and the platen 71 are opened, as indicated at dotted lines in FIG. 6, so that the composite label web 6 may be grasped and manually turned back in front of a turning pin 71*a*, which is disposed at the leading end of the platen 71. The strip is drawn back so that the cuts 5*a* through the turned back backing paper web 5 are brought into engagement with the feed teeth 69 then beneath the feed roller 70. After that loading process, the plate 71 and the bottom cover 89 are closed to restore their original positions.

When it is intended to issue the labels, the hand lever 61 is first squeezed. This contacts the operator for the microswitch 63, which is turned on to effect the power supply from the battery 36 disposed in the label holder 2. When the hand lever 61 is then released, the feed roller 70 is rotated one pitch in the counter-clockwise direction by the rotation of the pawls 73 so that the backing paper web 5 is pulled to the rear by the feed teeth 69. During this label strip motion, one of the labels 4, which are temporarily adhered to their backing paper web, is delaminated from the backing paper web 6 at the turning pin 71*a* and is fed to a position below a label applying roller 88. Although blank labels are fed out at the beginning by the idle feed of the printer 1, after the hand lever has been repeatedly squeezed and released, the marks 85 printed on the labels 4 are detected before long by the sensor 82 so that the display unit 77 and the issue lamp 78 are turned on. Since the labels 4 are fed in the reverse order of the sequence in which they are rolled up, i.e., in the order of the pieces of the printed information H, G, - - -, and A, the control is arranged such that the pieces of the printed information are transferred in the order of H, G, - - -, and A from the memory circuit 37 to the display unit 77.

Each of the pieces of printed information, i.e., the printed content and the label number, are displayed in human readable digits in the display unit 77. The sensor 82 detects the marks, each time the labels 4 are issued one by one by the actuation of the hand lever 61, thereby to count down the displayed label number one by one. When the label number display of the printed information H is reduced to zero, then the printed content is automatically changed to the label number of the printed information G.

If the push button 59 is pushed in during this course, the issue lamp 78 is put out, and the display of the display unit 77 is changed to show the subsequent printed information. Thus, all of the pieces of the printed information stored can be confirmed by pushing the push button 79 in succession. If the display is returned to that of the label then being issued at present, the issue lamp 78 is lit again.

The application of the labels 4 to articles can be effected by the action of the label applying roller 88, similarly to the usual hand labeler, if the label below the label applying roller 88 has its lower side (i.e., its adhesive side) applied to and rubbed against the article to be labeled.

The control device 81 is equipped with a power sparing mechanism using a timer, by which the battery 36 has its power supply interrupted, thereby to put out the display unit 77 and the issue lamp 78, unless the hand lever 61 is operated for a predetermined time period.

The label issuing operations are performed in a sequence opposite to the printing order at the printer 1 and to the rolling order at the label holder 2, i.e., the labels are issued in the order H, G, - - -, and A. This construction can be modified by first effecting the rewinding operation using a suitable rewinding mechanism, so that the labels are issued in the printing order A, B, - - -, and H and so that the display at the display unit 77 is effected in that printing order.

As has been described hereinbefore, the label printing operations of the invention are effected in a desk type printer, while the subsequent applications of the labels to the articles are effected through a cassette type label holder by means of a special portable type label applier. Thus, as compared with the manual application method according to the prior art, label application according to the invention is remarkably speeded up, and the efficiency of the applying work is highly improved while preventing the prints from being so rubbed by fingers that they become hard to read. As compared with a known hand labeler, on the other hand, not only is the printing performance of the invention superior, but also the print head need not be attached to the label applier in the present invention. As a result, the label applier may have its size and weight so reduced as to reduce fatigue of the workers and to improve the label applying speed.

If the apparatus is furnished, with the memory and display functions for the printed information of the printer of the invention, workers should not fail to apply the proper labels to a variety of commodities, even if labels printed with many kinds of indicia are rolled into one roll. This effect is important especially in the case of printing of bar codes, which are not readily human readable.

Although the present invention has been described in connection with preferred embodiments thereof, many variations and modifications will now become apparent to those skilled in the art. Is is preferred, therefore, that the present invention be limited not by the specific disclosure herein, but only by the appended claims.

What is claimed is:

1. A label printing apparatus comprising:

a frame;

a printer inside the frame for printing labels in a web of a series of labels, comprising feed means for advancing the web of labels along a feed path and printing means disposed along the feed path for printing the labels as they advance;

a mounting means on the frame for removably mounting a label holder to the label printing apparatus for receiving and winding the web of printed labels from the feed path onto a roll in the label holder; the mounting means comprising attachment means for cooperating with corresponding attachment means of the label holder for retaining the label holder; said attachment means comprising a pair of retainer pins movably mounted on the frame for fitting into a pair of notches in the corresponding attachment means of the label holder, the attachment means of the mounting means further comprising biasing means for holding the retainer pins in the notches; said mounting means further comprising detachment means for moving the retainer pins out of the retainer notches for detaching the label holder; said mounting means further comprising a rotatable transmission element for engaging a corresponding transmission element on the label holder for rotating the roll in the label holder, the mounting means further comprising rotary motion transmission means connected for rotating the rotatable transmission element when the rotary element rotates; said rotatable transmission element comprising a shaft having an end for engaging a corresponding end surface of the corresponding transmission element on the label holder, the end of the shaft being positioned for engaging the corresponding end surface when the label holder is mounted on the apparatus; said mounting means further comprising a biasing element for holding the end of the shaft against the corresponding end surface of the label holder; said second mentioned transmission element for the label holder comprising a rotatable shaft mounted for rotation on one side of said frame; said rotatable shaft being indented at one end to form a concave depression having radially extending teeth; and corresponding teeth on the end of said first mentioned rotatable transmission element engageable with the teeth of the second mentioned transmission element and disengageable therefrom to connect and disconnect the drive to the label holder; said label holder being demountable and mountable on the printer and an interlock member operable to interengage the label holder and the printer.

2. The apparatus of claim 1 further comprising a cutter on the frame for cutting the web of labels being advanced from the feed path before the web is wound onto the roll.

3. The apparatus of claim 1, further comprising an input circuit for inputting indicia printing instructions to the printing means for printing particular indicia, the mounting means further comprising an electrical connection for connection the input circuit to a memory circuit in the label holder, the input circuit further being for inputting the printing instructions to the memory circuit when the label holder is mounted on the apparatus.

4. The apparatus of claim 3 in which the input circuit inputs individual printing instructions for printing each label in the series of labels on the web.

* * * * *